United States Patent [19]

Vermilye

[11] Patent Number: 4,564,160
[45] Date of Patent: Jan. 14, 1986

[54] THRUST REVERSER BLOCKER DOOR ASSEMBLY

[75] Inventor: Michael L. Vermilye, Redmond, Wash.

[73] Assignee: The Boeing Company, Seattle, Wash.

[21] Appl. No.: 459,903

[22] PCT Filed: Sep. 29, 1982

[86] PCT No.: PCT/US82/01355
§ 371 Date: Sep. 29, 1982
§ 102(e) Date: Sep. 29, 1982

[87] PCT Pub. No.: WO84/01344
PCT Pub. Date: Apr. 12, 1984

[51] Int. Cl.⁴ .................................................. F02K 3/06
[52] U.S. Cl. .................... 244/110 B; 60/226.2; 239/265.29
[58] Field of Search ............... 244/110 B, 12.5, 53 B; 60/226.1, 226.2, 230; 239/265.29, 265.19, 265.31, 265.25

[56] References Cited
U.S. PATENT DOCUMENTS

| | | | |
|---|---|---|---|
| 2,841,954 | 7/1958 | Rainbow | 239/265.31 |
| 2,950,595 | 8/1960 | Laucher et al. | 239/265.31 |
| 3,019,600 | 2/1962 | Peek, Jr. | 60/226.2 |
| 3,262,271 | 7/1966 | Beavers | 60/226.2 |
| 3,500,645 | 3/1970 | Hom | 60/226.2 |
| 3,541,794 | 11/1970 | Johnson et al. | 239/265.31 |
| 3,964,257 | 6/1976 | Lardellier | 60/226.2 |
| 4,145,877 | 3/1979 | Montgomery | 60/226.2 |
| 4,278,220 | 7/1981 | Johnson et al. | 60/226.2 |

Primary Examiner—Galen L. Barefoot
Attorney, Agent, or Firm—Hughes & Cassidy

[57] ABSTRACT

A thrust reverser blocker door assembly for a fanjet engine (34) wherein a plurality of blocker doors (10) are disposed aerodynamically about a peripheral circumferential zone of a central fan duct (46) of the engine in a cruise configuration and are pivoted radially into an annular ring interrupting the fan duct in a thrust reversing configuration for diverting air radially outward and forward through a concentric bypass duct (48), each of the blocker doors (10) being secured for pivotal displacement by an articulated linkage (50) comprising a drag link (62) disposed for arcuate motion about a fixed pivot point (64) at its proximal end, an overcenter link (12) spanning the blocker door (10) and the distal end of the drag link (62) at a longitudinally translatable pivot point (70), and a biasing member (100) for tensioning the articulated linkage (50) and the blocker door (10) radially outward about the translatable pivot point (70) when in the cruise configuration.

3 Claims, 6 Drawing Figures

THRUST REVERSER BLOCKER DOOR ASSEMBLY

DESCRIPTION

1. Technical Field

The present invention relates, generally, to a thrust reverser blocker door assembly and, more especially, to such an assembly for a fanjet engine wherein air is diverted from a normal path through a fan duct during cruise conditions to a forwardly oriented path through a bypass duct during reverse thrust conditions. An improved, articulated linkage assembly permits the blocker doors to function within constraints of extremely shallow fan duct dimensions and large translation distance.

2. Description of the Background Art

Thrust reverser devices associated with jet aircraft engines are of course well known and are implemented in all manner of configurations. The central objective of each is the diversion of flow through or from the engine to a path having a forward aspect in order to achieve a reverse thrust. The reverse thrust, in turn, provides control over the flight characteristics of the aircraft; principally during a landing maneuver thereof for the purpose of slowing and/or stopping the craft.

Within this general context, there are two conceptual approaches for thrust reversing means. The hot, core (i.e., primary) exhaust flow of a jet engine may be diverted by means of an external blocker or thrust control assembly. Generally representative of that approach is the thrust control device of U.S. Pat. No. 4,252,286. While that apparatus works well for its intended purpose, the extreme environmental conditions obtaining in respect of reversing the hot core flow taxes most engineering materials and designs. Another approach, when one focuses on a fanjet, is the incorporation of a thrust reversing mechanism diverting the cooler fan flow for the thrust reversal objective. U.S. Pat. Nos. 3,262,268 and 3,280,561 are generally representative of that variety of apparatus.

Turning more specifically to the device disclosed in the '268 patent, it includes a plurality of thrust reverser flaps or doors disposed concentrically within the cowl of a fanjet engine and pivotally displaceable from a cruise configuration, wherein the same lie generally along the airflow path, to a thrust reversing configuration wherein the same are pivoted to block that path and divert airflow upwardly through cascade members and thence outward in a forward aspect of the engine. As noted in considerable detail in that patent, the manipulation of the blocker doors or flaps from the cruise to the thrust-reversed configuration is one accomplished with certain design difficulties. That manipulation is acheived in accordance with the invention disclosed therein, inter alia, by a scissors linkage arrangement joining each of the blockers in pivotal relationship with respect to a translatable portion of the cowl structure. The '561 patent is conceptually similar and adds little to the present assessment of such previous devices.

Fanjet engines are currently experiencing a resurgence in popularity for, amongst other reasons, good fuel efficiency. At the same time, however, the overall size specifications are being reduced into more efficient configurations and lighter weight designs. These objectives become somewhat antagonistic as the forces experienced during thrust reversal remain quite high and translation distances fairly large while fan duct dimensions become shallower. While the general concepts for thrust reversers outlined in the prior art remain viable, the precise structural arrangements heretofore employed fail to accommodate these newer diverse requirements. Furthermore, the prior art admits of general improvements in the control of forces imposed upon the blocker doors and the linkage members controlling displacement of same.

SUMMARY OF THE INVENTION

The present invention advantageously provides a thrust reverser blocker door assembly capable of functioning within an extremely shallow fan duct of a fanjet engine and yet capable of operating over a large translation distance. The assembly, and particularly the manipulative linkage members therefor, are also desirable for the ability to load the blocker doors at a point close to the center of pressure, thereby minimizing actuation system load requirements. The present design is further advantageous for its ability to preload the door and associated linkage members against the sonic environment within the fan duct, thereby minimizing the potential for vibration and accompanying wear and/or fatigue of the components.

The foregoing, and other advantages, of the present invention are realized in one aspect by providing a thrust reverser blocker door assembly for a fanjet engine wherein a plurality of blocker doors are disposed aerodynamically about a peripheral circumferential zone of the central fan duct of the engine in a cruise configuration and are pivoted radially inward into an annular ring interrupting the fan duct in a thrust-reversing configuration for diverting air radially outward and forward through a concentric bypass duct, wherein each of the doors is secured for pivotal displacement by an articulated linkage comprising a drag link disposed for arcuate motion about a fixed pivot point at its proximal end, an overcenter link pivotally spanning a blocker door and the distal end of the drag link at a longitudinally translatable pivot point, and a biasing member for tensioning the blocker door radially outward about the translatable pivot point and loading the linkage members when in the cruise configuration. The overcenter link also takes up lost motion during the pivotal translation of the articulated linkage and associated blocker door, allowing operation within very confined fan ducts. In a particularly preferred embodiment of the present invention, the blocker door is comprised of a panel having a slot formed therein, the overcenter link is disposed within that slot about axle means generally normal to the action of the articulated linkage, and the biasing means is a spring member bridging the panel and the overcenter link. In that highly preferred embodiment, the overcenter link itself is most preferably a generally "H"-shaped link having a first throat receiving the drag link and a second throat receiving a boss formed on or otherwise associated with the blocker door. The spring in that preferred implementation is a torsion spring enveloping the axle on either side of the second throat and bridging the overcenter link in torsional engagement therewith. It is further preferred to include a land on the overcenter link for engagement with the associated blocker door during translation of the assembly to the thrust-reversing configuration to assist in rotation of the blocker door into the fan duct.

Other advantages of the present invention will become apparent and a fuller appreciation of its structure

DETAILED DESCRIPTION OF THE INVENTION

The present invention relates, generally, to thrust reverser blocker doors for fanjet engines and, more especially, to an improved linkage therefor which permits the blocker doors to function within constraints of extremely shallow fan duct dimensions but over large translation distances. Accordingly, the invention will now be described with reference to certain preferred embodiments within the aforementioned context; albeit, those skilled in the art will appreciate that such a description is meant to be exemplary only and should not be deemed limitative.

Figure 1:
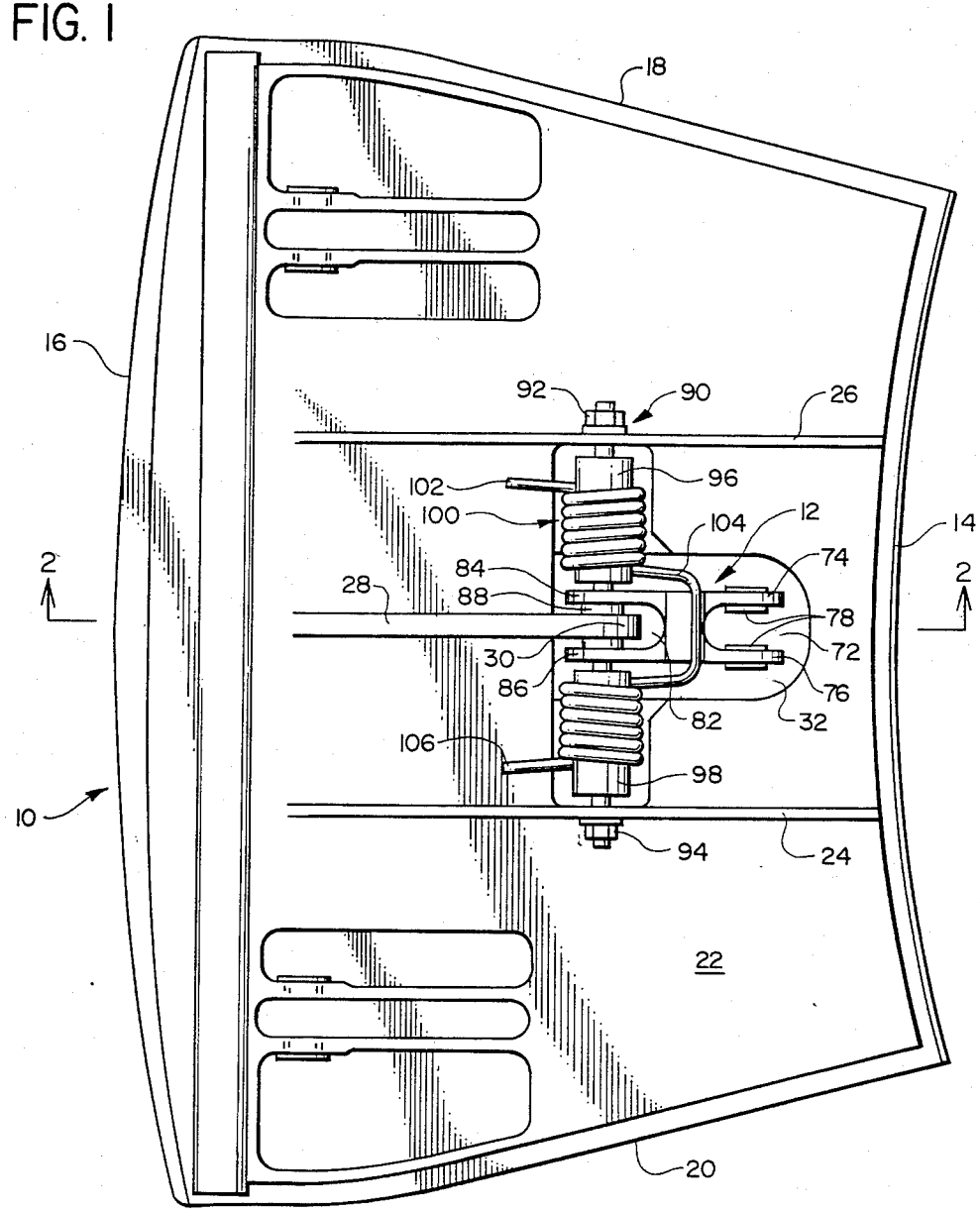
FIG. 1 is a plan view of a thrust reverser blocker door incorporating an overcenter link in accordance with the present invention.

Turning to the figures of drawing, in each of which like parts are identified with like reference characters, FIG. 1 shows the basic structure of a thrust reverser blocker door, disignated generally as 10, and an overcenter link in accordance with the present invention, designated generally as 12. The door 10 is conventionally and preferably fabricated from a lightweight material having good wear and strength characteristics, such as an aluminum alloy. The door is configured to mate and cooperate with a plurality of like doors, as described more fully hereinbelow; and for that purpose is formed to include inner and outer, generally concentrically arcuate edges 14 and 16 respectively and tapered side edges 18 and 20. The general form of the door is, accordingly, that of an arcuate wedge segment of a circle with a radius corresponding generally to the radius of curvature of the outer edge 16. When associated with a plurality of like doors disposed with side edges in mating engagement, an annular ring is thereby formed. The door 10 in this preferred embodiment includes a central panel 22 having transverse stiffening ribs 24 and 26 on its rearward face extending to the inner edge 14, and a central rib 28 which terminates in a boss 30 projecting within a central slot or aperture 32 cut from the panel. The overcenter link 12 is received within that cutout region.

Figures 2, 3:
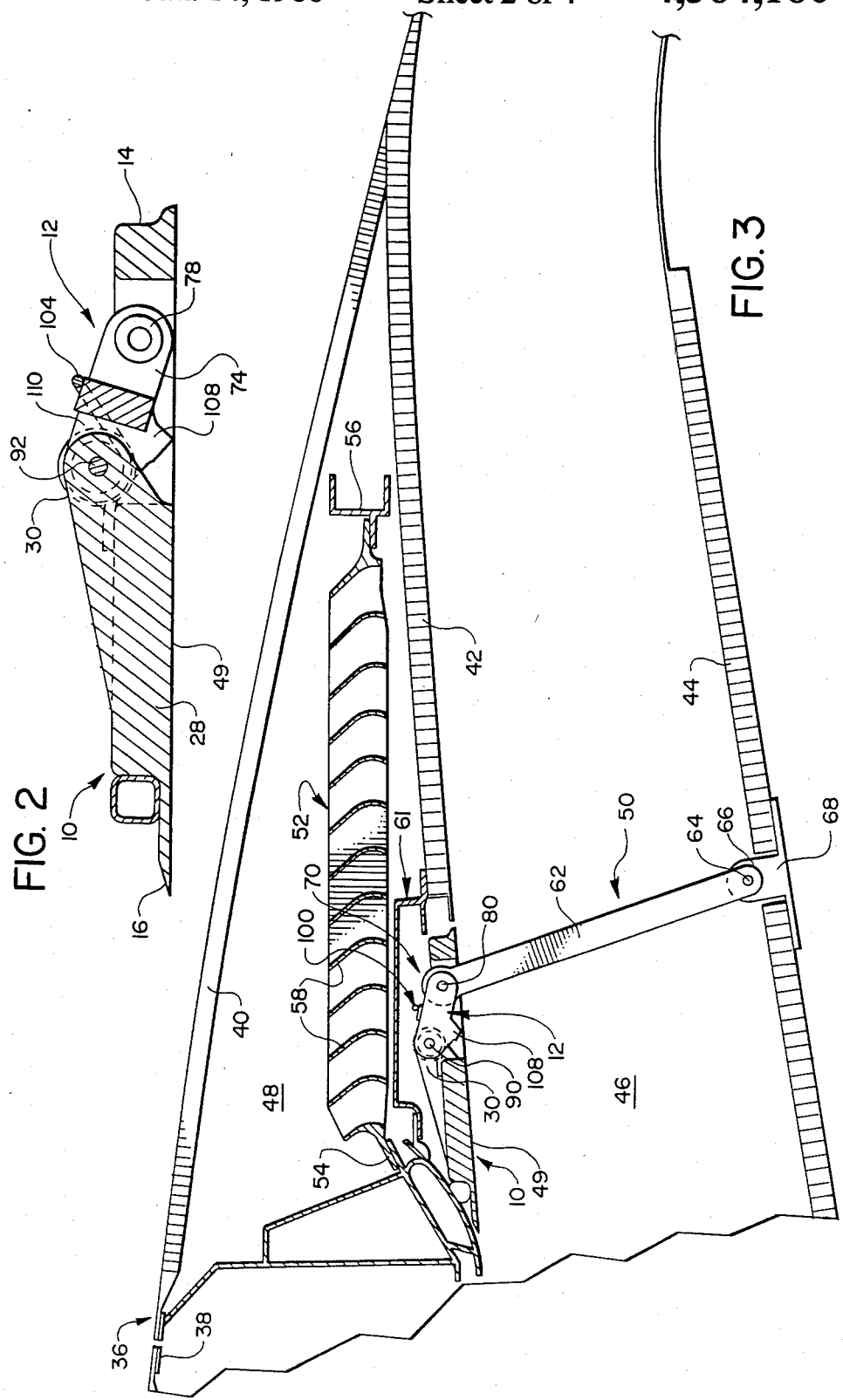
FIG. 2 is a sectional view taken substantially along the line 2—2 of FIG. 1.
FIG. 3 is a fragmentary, sectional view of the top side half of a fanjet engine showing a blocker door incorporating an articulated linkage in accordance with the present invention, illustrated in the stowed position.
Figure 4:
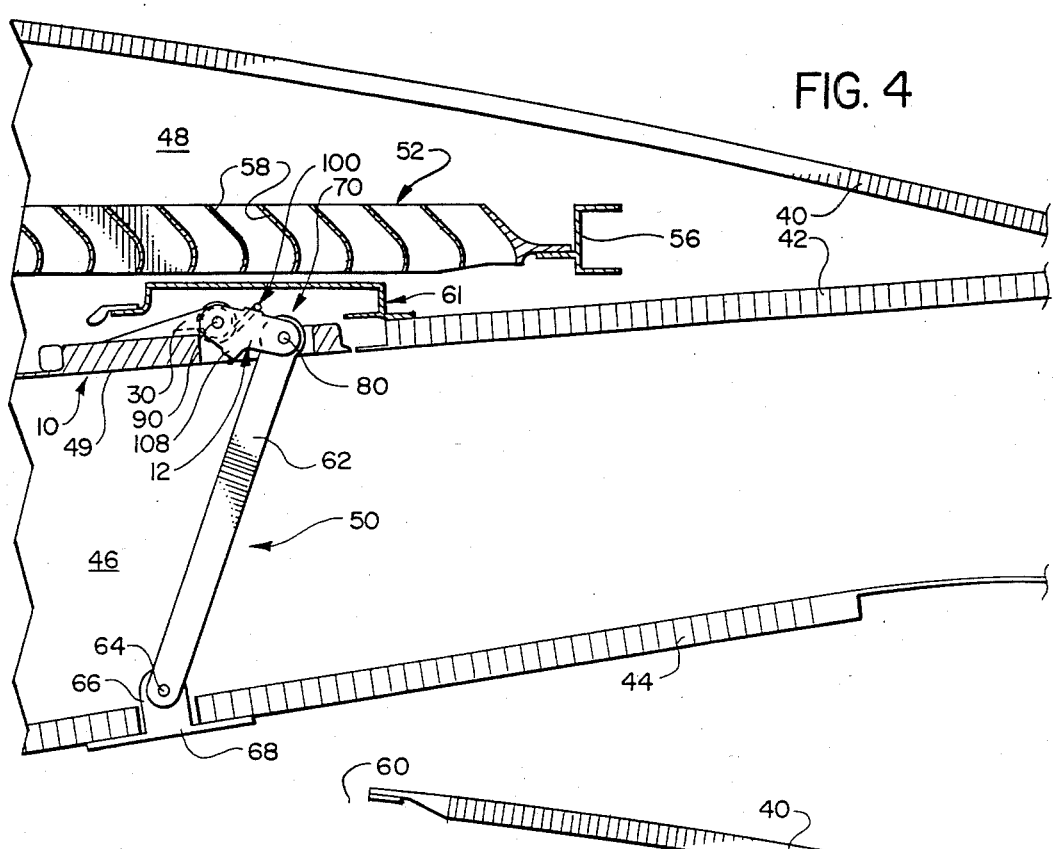
FIG. 4 is a view similar to FIG. 3, showing the blocker door assembly translated during an intermediate stage of a thrust-reversing sequence.
Figure 5:
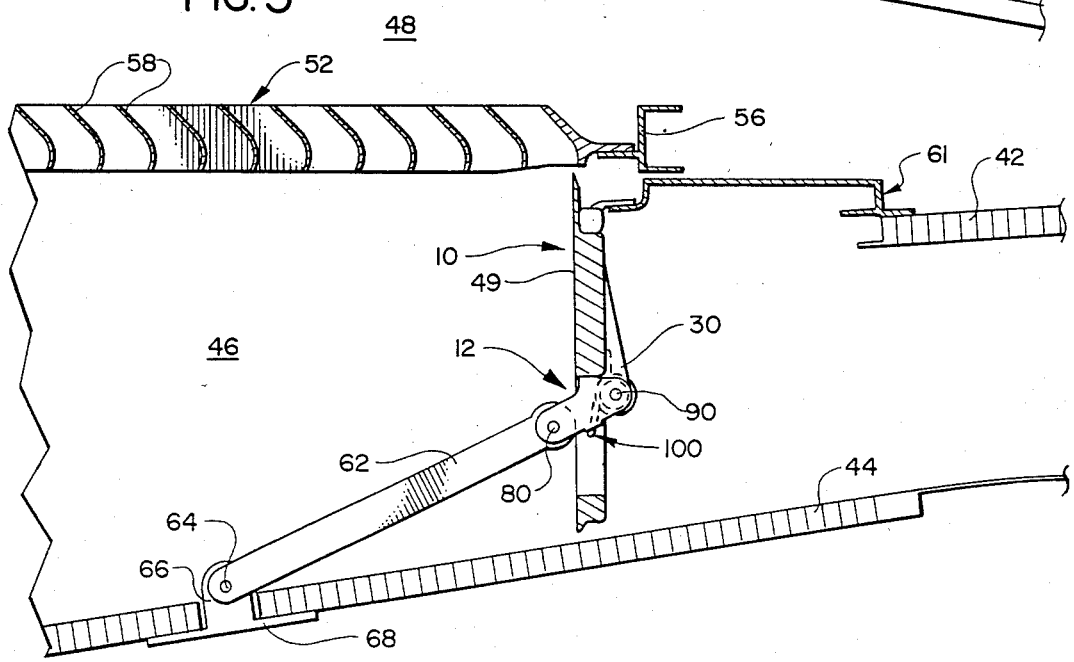
FIG. 5 is a view similar to FIGS. 3 and 4, showing the blocker door in its thrust-reversing configuration; and, FIG. 6 is a schematic view showing the travel of the linkage assembly in accordance with the present invention.

Continuing briefly with a description of the door itself and its intended use in a thrust reverser for a fanjet engine, the same operates under varying and sometimes extremely adverse environmental conditions. As is best envisioned with reference to FIGS. 3-5, a fanjet engine designated generally as 34 is circumscribed by a segmented cowl designated generally as 36. The cowl 36 thus includes a forward segment 38 and an aft segment 40 capable of rearward translation along an axis having a major component lying along the longitudinal axis of the engine 34. Disposed internally of the enveloping cowl 36 is a translating sleeve 42 slaved for movement with the cowl segment 40. Lying yet closer to the engine centerline is a stationary engine wall 44. [It will be appreciated at this juncture that FIGS. 3-5 illustrate but the top one-half of the duct portion of engine 34; the omitted lower portion being a mirror image.] These generally longitudinal members thereby define an annular fan duct 46 through which engine air is forced by a fan (not shown) for operation of the engine. An annular bypass duct 48 is disposed circumferentially adjacent and radially outward of the fan duct 46, defined between the aft cowl segment 40 and translating sleeve 42.

In the normal or cruise mode shown in FIG. 3, the blocker door 10 lies generally contiguous with the surface of translating sleeve 42 and functions as a continuous extension thereof defining a forward zone of the fan duct 46. The forward face 49 of the panel 22 thus constitutes an aerodynamic surface witin the engine. Notwithstanding the fact that airflow to the duct 46 is cool fan air, in contradistinction to the hot core gas from a jet, the environment can nonetheless be quite severe; particularly in respect of the sonic flow of air impinging on or wiping across the moveable components. The door 10 and its associated linkage members must be capable of withstanding this loading without vibrating, lest that motion lead to fatigue and wear of the components. And, as noted below, the door must function to divert airflow in a thrust reversing configuration by interposition within the duct 46, under which conditions it is subjected to considerable force. With the reduced fan duct dimensions currently employed in state-of-the-art designs for fanjet engines, the door 10 must be deployed not only within narrower transverse dimensions but over considerable translation distances. A linkage assembly, designated generally as 50, including the overcenter link 12, accommodates the requirements of these designs.

The door 10 and linkage assembly 50 are responsive to translation of the aft cowl portion 40 and translating sleeve 42 during a thrust reversing sequence, as shown at three different stages in FIGS. 3-5. As noted above, the configuration of FIG. 3 is one in a normal or cruise mode where fan air is directed through the fan duct 46. When in a reverse thrust mode, shown in FIG. 5, the fan duct 46 is blocked by the ring of doors 10, interposed within the duct and collectively having a complementary geometric configuration with respect thereto, for diversion of fan air into the bypass duct 48. A cascade designated generally as 52 is disposed within the bypass duct 48 secured by forward and aft brackets 54 and 56 respectively. The cascade includes a plurality of vanes 58 curved with a forward aspect to divert air in that direction through the duct 48. Following the progression shown in FIGS. 3-5, the reverse thrust mode is achieved by aft or rearward movement of the cowl portion 40 and translating sleeve 42, thereby exposing an outlet port 60 for the duct 48. Concomitantly, the blocker doors are translated aft due to attachment within bracket means 61 borne on sleeve 42 and are then pivoted downwardly into the duct 46 about a forward hinge point on the bracket as shown in FIG. 5. Air formerly passing through the duct now strikes the face 49 of the panel 22 and is diverted upwardly, through the cascade 52 which, by virtue of the forward aspect on vanes 58, directs the flow forwardly and out through the opening 60 to achieve reverse thrust.

Linkage assembly 50, responsible for control in the deployment of blocker door 10, is comprised of a drag link 62, overcenter link 12 and biasing means for tensioning the articulated linkage formed thereby. The drag link 62 is pinned or otherwise secured for fixed rotation about its proximal end. In the embodiments shown in the figures of drawing, this is achieved by securing the drag link 62 by a pin 64 to a boss 66 secured to the stationary engine wall 44 by a flange means 68. Both the drag link and boss are provided with suitable bushings or bearings within this pin joint for improved dynamic performance. The distal end of the drag link 62 is pinned at a joint 70 to the overcenter link 12 in order to form an articulated, translatable linkage member. As can be seen in FIG. 3, the drag link bridges the radial span of the fan duct 46 to present the pin joint with link 12 above the sonic flow of air through that duct in order to reduce vibration. As noted generally above, and as will be described more fully below, that juncture is biased to tension or preload the linkage; and with the overcentered disposition of the linkage component, this will also be felt at the lower joint and thereby minimize vibration. Hence, improved wear and fatigue performance of the assembly are provided.

The overcenter link 12 in the preferred embodiment of the present invention, best viewed in FIGS. 1 and 2, is shown to be a generally "H"-shaped unitary member having a first throat 72 defined between opposing walls 74 and 76. Each of these walls includes an aperture receiving a bushing 78. The distal end of drag link 62 is disposed within the throat 72 and is secured by a pin 80, as shown in FIGS. 3-5, inserted through the bushings 78 and a corresponding aperture in that link having its own bushing or bearing therein. Thus, the drag link 62 and overcenter link 12 are free for pivotal rotation about the pin joint 70. A second throat 82 is defined between walls 84 and 86 of the link 12. These walls are likewise formed with apertures receiving bushings or bearings 88. The boss 30 is formed with a corresponding aperture having a bushing therein and is received on axle means 90 within the throat 86, whereby the link is free for pivotal movement about the axle means 90 vis-a-vis blocker door 10. In the preferred embodiment shown in FIGS. 1 and 2, the axle means 90 is comprised of a bolt 92 spanning the slot 32 between the ribs 24 and 26, secured by a fixture means 94, in this case a nut. First and second, generally cylindrical spacers 96 and 98, such as nylon spacers, are disposed about the bolt 92, residing on either side of the pinned joint between the door and overcenter link. A biasing means 100, in this case a torsion spring, is received about the spacers 96 and 98, in cooperation with both the panel 22 and overcenter link 12 in order to tension the joint between these components and preload the linkage, inter alia, to reduce vibration in the assembly. The spring 100 is illustrated to have a first segment wrapped about the spacer 96 terminating at a leg 102 in engagement with the panel 22. The spring continues with a bridging leg 104 spanning the central area of the link 12 and bearing downwardly on it and then merges to another wrap about the spacer 98. The spring terminates in a corresponding leg 106 in engagement with the panel 22. The biasing spring means 100 serves to preload the door 10 and the drag link 62 against the sonic environment within the engine and aids the function of the overcenter link in accounting for lost motion during a deployment of the door from cruise to reverse thrust configurations; and, accordingly, any other biasing configuration to achieve these aims might equally well be employed to good advantage.

Figure 6:
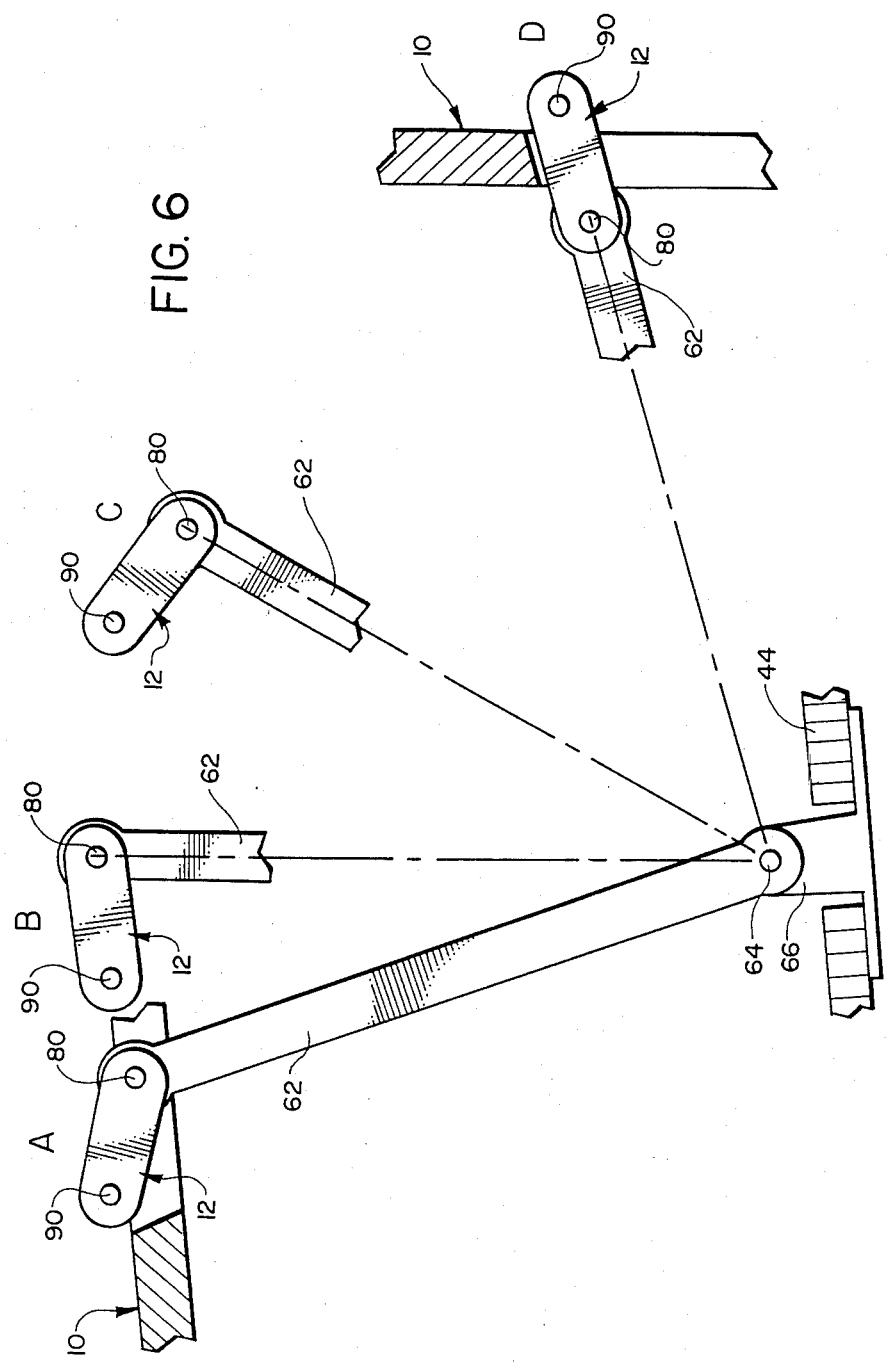

The overcenter link 12 is designed with an eye toward accommodating lost motion during rotation of the articulated linkage 50 and then pivoting the blocker door 10 rather abruptly. For this purpose, a land 108 is formed along the bottom edge portion of the leg 110 joining the two throat elements 72 and 82 of the link 12. As is best envisioned with reference to FIGS. 3-5, the link 12 pivots about the distal end of the drag link 62 during an aft translation of the cowl and sleeve, 40 and 42 respectively; is tensioned upwardly by virtue of the biasing force on torsion spring 102; unwinds that spring during further translation and ultimately engages the blocker door 10 to pivot same into the blocking configuration of FIG. 5. Preferably, the portion of the panel 22 with which the land 108 engages is configured to accommodate this cooperation. FIG. 6 illustrates schematically the linkage progression.

Four positions are illustrated in FIG. 6 for the linkage assembly 50 and associated door 10. Position A corresponds to the stowed configuration during a normal cruise mode and position D the deployed configuration for thrust reversal; with positions B and C being intermediate those extremes. With the assembly in the position shown in Figure A—which, it will be noted, is forwardly overcenter—the translatable sleeve is commanded to go into a reverse or extended position. The blocker doors, hinged to the sleeve, begin traversing aft toward the position denoted B. Initial overcenter motion is upward, induced by drag link rotation but, as can be seen by comparing FIGS. 4 and 6, the door itself remains stationary in its radial orientation vis-a-vis the duct 46. The overcenter link continues to rotate until the drag link reaches a generally vertical position, as shown in position B. Further sleeve translation overcomes center and causes the drag link to continue rotation, but in a downward direction; progressing toward the position denoted as C. The overcenter link 12 follows due to the pinned joint connection 80. Continued sleeve translation to and through position C pulls the drag link and overcenter link to a predetermined position where the blocker door 10 must begin rotation. At about this point, the overcenter link bears outwardly on the blocker door forcing it to rotate as the land engages same. The position at which this occurs is adjustable to suit conditions by appropriate design in respect of the tensioning force on the biasing spring, the configuration of the land on the link 12, and the cooperative relationship of the articulated elements. The sleeve continues to translate aft until the full reverse position is attained as shown at D. It can be seen that the overcenter link 12 is now in line with the drag link 62 to form a purely tensional load path for the air load impinging upon the face of the door 10; a load which can be considerable and, hence, the advantage of a purely tensional load path.

As is now apparent from the foregoing description, the thrust reverser blocker door assembly of the present invention, including the unique articulated linkage thereof, satisfies all of the basic design criteria for its intended application in the thrust reversing of a fanjet engine. Additionally, the components are caused to reside in a state of tension during the normal cruise configuration, whereby vibration and associated wear and/or fatigue are minimized. When commanded to serve its role in thrust reversal of the fan air, the assembly is efficiently and reliably translated into the fan duct. Shallower fan duct dimensions are accommodated by the overcenter arrangement of components, wherein the overcenter link accounts for lost motion in the initial translation of the blocker door and then assists in a positive and abrupt rotation thereof into a deployed configuration; during which time fairly considerable translation distances are traversed.

While the invention has now been described with reference to certain preferred embodiments thereof, those skilled in the art will appreciate that various substitutions, modifications, changes and omissions may be made without departing from the spirit thereof. Accordingly, it is intended that the scope of the present invention be limited solely by that of the claims granted herein.

What is claimed is:

1. A thrust reverser blocker door assembly for a fanjet engine wherein a plurality of blocker doors are disposed aerodynamically about a peripheral circumferential zone of a central fan duct of the engine in a cruise configuration and are pivoted radially inward into an annular ring interrupting said fan duct in a thrust reversing configuration for diverting air radially outward and forward through a cencentric bypass duct, each of said blocker doors being secured for pivotal displacement by an articulated linkage comprising a drag link disposed for arcuate motion about a fixed pivot point at its proximal end, an overcenter link pivotally spanning said blocker door and the distal end of said drag link at a longitudinally translatable pivot point, and biasing means for tensioning said articulated linkage and biasing said blocker door radially outward about said translatable pivot point when in said cruise configuration, said blocker door being comprised of a panel having a slot formed therein, said overcenter link being disposed within said slot about axle means generally normal to the action of said articulated linkage, said biasing means being a spring means bridging said panel and said overcenter link, said overcenter link being a generally "H"-shaped link having a first throat receiving said drag link and a second throat receiving boss means on said blocker door, said spring means being a torsion spring means enveloping said axle means on either side of said second throat and bridging said overcenter link in torsional engagement therewith.

2. The thrust reverser blocker door assembly of claim 1, further comprising land means on said overcenter link for engagement with said blocker door during the translation of said assembly between said cruise and thrust reversing configurations and rotation of said blocker door into said fan duct.

3. The thrust reverser blocker door assembly of claims 1 or 2, wherein said translatable pivot point is forwardly overcentered in said cruise configuration in respect of pivotal displacement thereof to said thrust reversing configuration.

* * * * *